United States Patent
Ostberg et al.

(10) Patent No.: US 9,244,608 B2
(45) Date of Patent: Jan. 26, 2016

(54) METHOD AND SYSTEM FOR GESTURE IDENTIFICATION

(71) Applicant: Synaptics Incorporated, San Jose, CA (US)

(72) Inventors: Anna Ostberg, San Jose, CA (US); Richard Schediwy, Union City, CA (US)

(73) Assignee: Synaptics Incorporated, San Jose, CA (US)

( * ) Notice: Subject to any disclaimer, the term of this patent is extended or adjusted under 35 U.S.C. 154(b) by 57 days.

(21) Appl. No.: 14/092,440

(22) Filed: Nov. 27, 2013

(65) Prior Publication Data

US 2015/0145774 A1  May 28, 2015

(51) Int. Cl.
G09G 5/00 (2006.01)
G06F 3/0488 (2013.01)

(52) U.S. Cl.
CPC .. G06F 3/04883 (2013.01); *G06F 2203/04808* (2013.01)

(58) Field of Classification Search
CPC ............ G06F 3/04883; G06F 3/04886; G06F 3/0488; G06F 2203/04808; G06F 3/041; G06F 3/0482; G06F 3/0486; G06F 3/017; G06F 3/044; G06F 3/04817; G06F 2203/04806; G06F 3/04842; G06F 9/4443; G06F 3/0485; G06F 3/04845; G06F 2203/04104; G06F 2203/04106; G06F 3/03547; G06F 2200/1634; G09G 5/14; G09G 2300/0426; G09G 2300/0439; G09G 2300/0478; G09G 2340/10; G09G 2340/125; G09G 3/3648; G09G 5/006; G09G 2320/062; G09G 2320/064; G09G 2320/0646; G09G 2330/021; G09G 2340/045
USPC .................................. 345/156, 169, 173–175
See application file for complete search history.

(56) References Cited

U.S. PATENT DOCUMENTS

| | | | |
|---|---|---|---|
| 8,219,936 B2 | 7/2012 | Kim et al. | |
| 8,381,135 B2 | 2/2013 | Hotelling et al. | |
| 2006/0267966 A1 | 11/2006 | Grossman et al. | |
| 2011/0175832 A1* | 7/2011 | Miyazawa et al. | 345/173 |
| 2011/0234491 A1 | 9/2011 | Nurmi | |
| 2012/0036479 A1 | 2/2012 | Kasahara et al. | |
| 2013/0141371 A1* | 6/2013 | Hallford et al. | 345/173 |
| 2013/0162513 A1 | 6/2013 | Ronkainen | |

* cited by examiner

*Primary Examiner* — Duc Dinh
(74) *Attorney, Agent, or Firm* — Osha Liang LLP (57) ABSTRACT

A method for gesture identification includes determining a first gesture is performed on a surface sensing region. The first gesture includes at least one input object. The method further includes determining a first action corresponding to the first gesture, and issuing, based on performing the first gesture, a first report reporting the first gesture and the first action. The method further includes determining, within a first predefined length of time subsequent to performing the first gesture, a presence of the at least one input object in an above surface sensing region, determining a second action corresponding to the first gesture and the at least one input object being in the above surface sensing region within the predefined length of time, and issuing a second report reporting the second action.

13 Claims, 4 Drawing Sheets

METHOD AND SYSTEM FOR GESTURE IDENTIFICATION

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a method for gesture identification including determining a first gesture is performed on a surface sensing region, where the first gesture includes at least one input object, determining a first action corresponding to the first gesture, and issuing, based on performing the first gesture, a first report reporting the first gesture and the first action. The method further includes determining, within a first predefined length of time subsequent to performing the first gesture, a presence of the at least one input object in an above surface sensing region, determining a second action corresponding to the first gesture and the at least one input object being in the above surface sensing region within the predefined length of time, and issuing a second report reporting the second action.

In general, in one aspect, embodiments relate to a method for gesture identification including determining a first gesture is performed on a surface sensing region, where the first gesture includes at least one input object, determining a first action corresponding to the first gesture, and issuing, based on the performance of the first gesture, a first report reporting the first gesture and the first action. The method further includes determining, within a first predefined length of time subsequent to performing the first gesture, a presence of the at least one input object in an above surface sensing region, determining, within a second predefined length of time subsequent to determining the presence of the at least one input object being in the above surface sensing region, a second gesture is performed on the surface sensing region, where the second gesture includes the at least one input object, determining a second action corresponding to the second gesture based on the first gesture, the presence of the at least one input object in the above surface sensing region, and the second gesture, and issuing, based on the performance of the second gesture, a second report reporting the second gesture and the second action.

In general, in one aspect, embodiments relate to a processing system for a capacitive input device, the capacitive input device including an array of sensor electrodes configured to sense input objects in a sensing region of the input device. The processing system including functionality to determine a first gesture is performed on a surface sensing region, where the first gesture includes at least one input object, determine a first action corresponding to the first gesture, and issue, based on performing the first gesture, a first report reporting the first gesture and the first action. The processing system further includes functionality to determine, within a first predefined length of time subsequent to performing the first gesture, a presence of the at least one input object in an above surface sensing region, determine a second action corresponding to the first gesture and the at least one input object being in the above surface sensing region within the predefined length of time, and issue a second report reporting the second action.

Other aspects of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is used to distinguish between the elements. By way of an example, a first element is distinct from a second element, and the first element may encompass more than one element and succeed the second element in an ordering of elements.

In general, embodiments of the invention are directed toward determining an action to perform based on an input object being in an above surface sensing region within a predefined length of time after a previous gesture on a surface sensing region and a previous action corresponding to the previous gesture. The subsequent action may further be based on the input object being back on the surface sensing region. Specifically, one or more embodiments of the invention may determine the intent of the user in determining the subsequent action based on the input object being in the above surface sensing region and the previous action. In other words, the determined subsequent action is different than a determined subsequent action after the input object departs the sensing region for more than the predefined length of time.

Figure 1A:
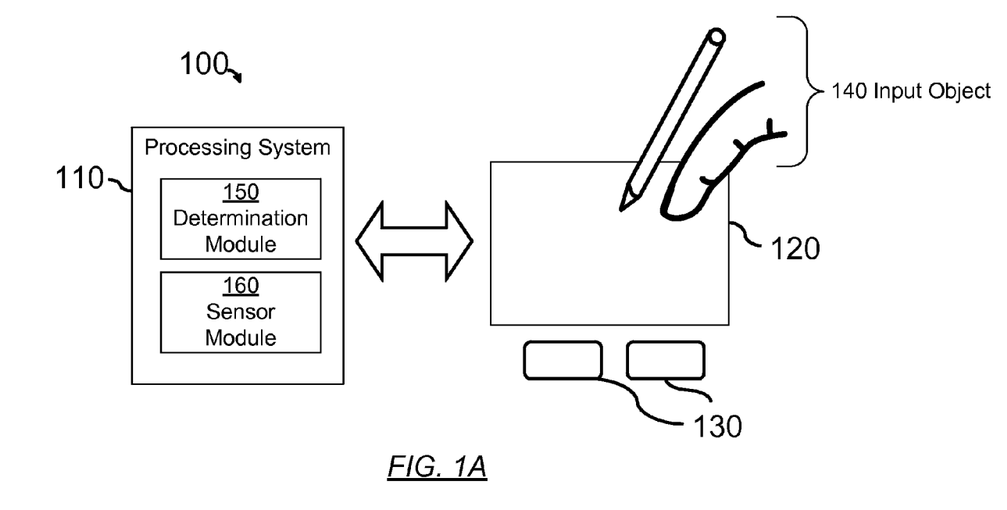
FIGS. 1A and 1B show schematic diagrams in accordance with one or more embodiments of the invention.

Turning now to the figures, FIG. 1A is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1A, the input device 100 is shown as a proximity sensor device (also often referred to as a "touchpad" or a "touch sensor device") configured to sense input provided by one or more input objects (140) in a sensing region (120). Example input objects include fingers and styli, as shown in FIG. 1A. Throughout the Specification, the singular form of input object is used. Although the singular form is used, multiple input objects exist in the sensing region (120). Further, which particular input objects are in the sensing region may change over the course of the gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

Figure 1B:
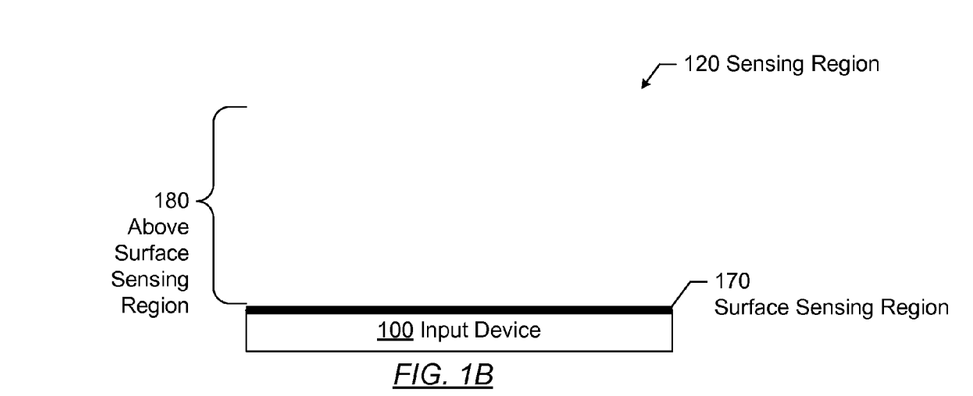

FIG. 1B shows an example sensing region (120) of an input device (100) in one or more embodiments of the invention. As shown in FIG. 1B, in some embodiments, the sensing region (120) extends from a surface of the input device (100) in one or more directions into space until signal-to-noise ratios prevent sufficiently accurate object detection. The distance to which this sensing region (120) extends in a particular direction, in various embodiments, may be on the order of less than a millimeter, millimeters, centimeters, or more, and may vary significantly with the type of sensing technology used and the accuracy desired. Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment. In such embodiments, the sensing region may include a surface sensing region (170) and an above surface sensing region (180).

In many embodiments, the surface sensing region (170) corresponds to a portion of the sensing region that has contact with an input surface (e.g. a touch surface) of the input device (100) and/or contact with an input surface of the input device (100) coupled with some amount of applied force or pressure. Here, the contact corresponds to a physical touching between the input object and the input surface. In various embodiments, input surfaces may be provided by surfaces of casings within which the sensor electrodes reside, by face sheets applied over the sensor electrodes or any casings, etc. In such a scenario, the contact with the input surface may correspond to contact with the surfaces of casings, face sheets or any other housing of the sensor electrodes.

In contrast, in many embodiments, the above surface sensing region (180) corresponds to a portion of the sensing region that does not involve contact with the input surface. In other words, the above surface sensing region (180) does not include a portion of the sensing region that physically touches or is physically connected to the input device. The above surface sensing region (180) is distinct from and does not overlap with the surface sensing region (170). Further, although the terms surface and above surface are used herein, the above surface sensing region may be angularly offset from the surface sensing region. In other words, the above surface sensing region may include any area that is capable of being measured by the sensing electrodes and that is distinct from and non-overlapping with the surface sensing region. For example, the above surface sensing region may include areas that are next to the input device (100) and do not touch the input surface. In various embodiments, the surface sensing region (170) may further correspond to a portion of the sensing region that is proximate with the input surface of the input device, where the portion of the sensing region that is proximate the input surface is not comprised within the above surface sensing region. In many embodiments, the surface sensing region corresponds to a first portion of the sensing region and the above the surface sensing region corresponds to a second portion of the sensing region, where the first portion of the sensing region is between the surface of the input device and the second portion of the sensing region. Further, in one embodiment, the sensing surface region and the above sensing region are configurable parameters, such that portions of the sensing region that are comprised within in each are a configurable parameter.

Returning to FIG. 1A, the input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a trans capacitance sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more input objects (140) in the sensing region, and/or to one or more sources of environmental interference. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1A, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1A, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and perform other operations.

The sensor module (160) may include functionality to drive the sensing elements to transmit transmitter signals and receive resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1A shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1A shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1A, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
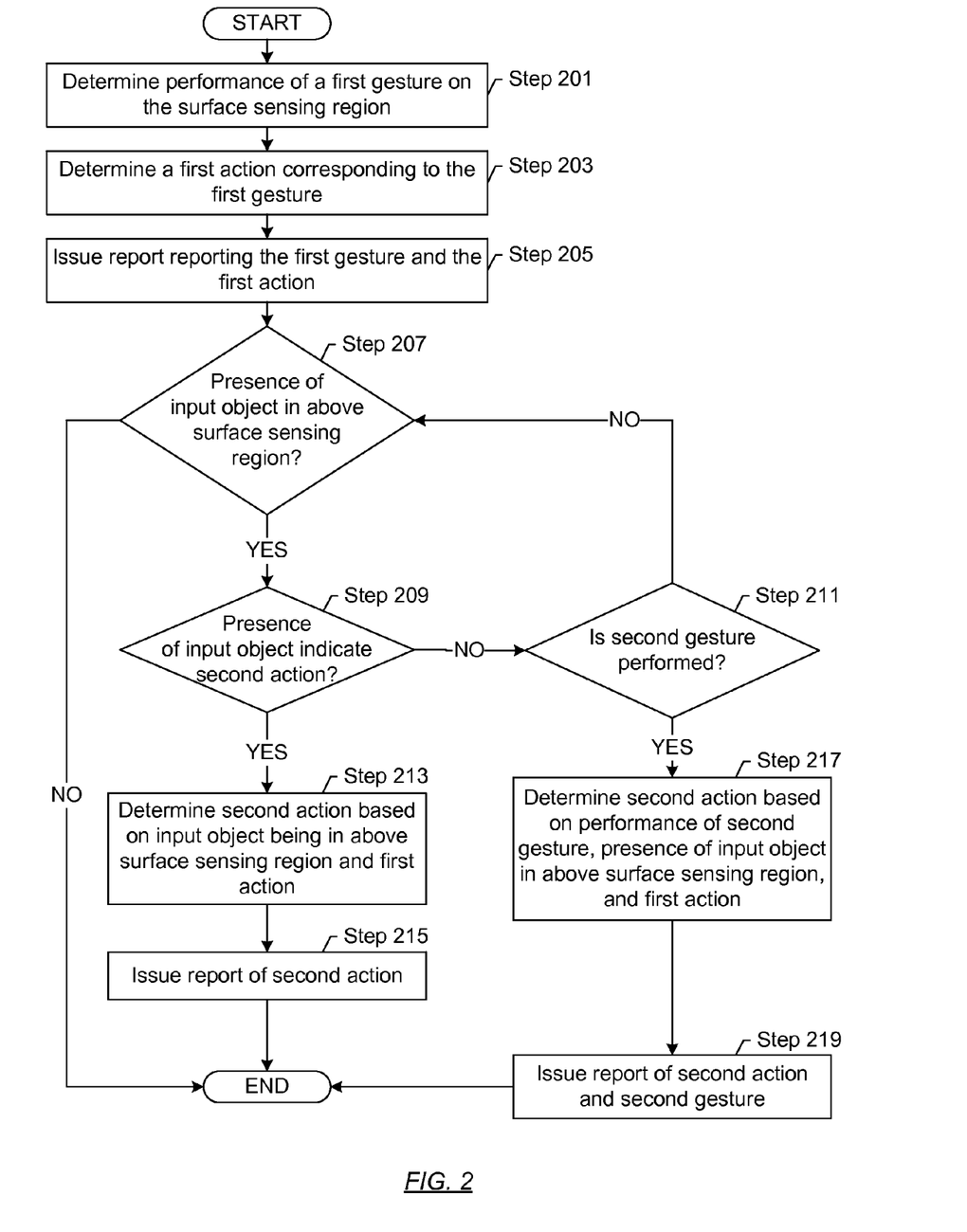
FIG. 2 shows a flowchart in accordance with one or more embodiments of the invention.

FIG. 2 shows a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Turning to FIG. 2, the performance of a first gesture is determined on the surface sensing region in Step 201. In particular, the first gesture is a completed gesture by the user using an input object. Determining the performance of the first gesture may include capturing positional information as the input device moves along the surface sensing region. The captured positional information may be compared against stored gestures or rules to determine the first gesture.

In Step 203, in response to the first gesture, a first action corresponding to the first gesture is determined. In one or more embodiments of the invention, each stored gesture has a corresponding action. After determining the first gesture, the action matching the first gesture is identified.

In Step 205, a report reporting the first gesture and the first action is issued in one or more embodiments of the invention. In one or more embodiments of the invention, issuing the report may include at least a portion of the determination module providing positional information to the device driver, which analyzes the positional information and determines the first action. The device driver may then issue a command to the operating system or another software component that identifies the first action. Alternatively or additionally, both the positional information and the command may be transmitted to the operating system or another software component. Other techniques for reporting the first gesture and the first action may be performed without departing from the scope of the invention. Regardless of the technique used, after the first action is reported, the first action is performed independent and without regard to any subsequent action. In other words, the electronic system performs the first action. The first action may be performed concurrently with or prior to any subsequent step in the flowchart.

In Step 207, a determination is made whether the input object is present in the above surface sensing region in accordance with one or more embodiments of the invention. In one or more embodiments of the invention, the determined presence may be based on whether the input object is in the above surface sensing region within a predefined length of time. In particular, the predefined length of time is the threshold amount of time that the input object may be out of the sensing region and/or not detected in the sensing region. The predefined length of time is predefined in that the length of time is defined as part of configuring the input device or the device driver, manufacturing the input device, generating firmware or the device driver, or at another such time. The predefined length of time may be virtually any small amount of time in which a lack of presence of the input object does not indicate any intent on the part of the user. In one or more embodiments of the invention, the predefined length of time may be the immediately subsequent sensing frame of scanning the sensing region after the final sensing frame in which first gesture is completed, a limited number of subsequent sensing frames of scanning the sensing region after the final sensing frame in which first gesture is completed, within one or more microseconds in which the first gesture is completed, or another such amount of time.

If the input object is not present in the sensing region for more than the predefined length of time, then the method proceeds to end. In particular, future performed gestures are determined to be performed independently of the previous gesture. In other words, the system proceeds to process as normal and ignores past actions and gestures.

However, if the input object is in the above surface sensing region, then a determination is made whether such a presence indicates a second action in Step 209. Whether the presence of the input object in the above surface sensing region indicates a second action is based on the first action.

If the presence of the input object indicates a second action, the second action is determined based on the input object being in the above surface sensing region and the first action in Step 213. Determining the second action may be performed by accessing the storage. In particular, the stored gesture for the first action may be related, directly or indirectly, in storage on the input device or electronic system to both the first action and to a second action where the input object is in the above surface sensing region.

For example, consider the example in which the first action is a scroll, the continued presence of the input object being the above surface sensing region may indicate a flick of the scroll. A flick of the scroll is where the user would like to continue the scroll for multiple entries, lines, pages, or panes after completing the first scroll. Thus, if the input object is detected to remain in the sensing region, then the second action is determined to be a flick or a quick scroll.

By way of another example, if the first gesture is a back and forth movement of the input object on the surface sensing region, such a back and forth movement may indicate that the user would like to move the cursor around on a display. A back and forth movement may appear as a random movement. Thus, the first action is to move the cursor in accordance with the back and forth movement. However, when the input object hovers in the above surface sensing region, the second action may be determined to be an emphasizing of the cursor. Specifically, the hovering of the input object in the above surface sensing region immediately preceding a back and forth movement may indicate that the user cannot identify the cursor on the display. In such embodiments, the second action is to emphasize the cursor such that the cursor may be clearly visible to the user. Emphasizing the cursor may include, for example, moving the cursor to a central position on the display, highlighting the cursor, surrounding the cursor with a halo image, enlarging the cursor, animating the cursor, moving the cursor, or performing another action or combination thereof.

Continuing with FIG. 2, a report of the second action is issued in Step 215. Reporting the second action notifies the operating system and/or another component of the electronic system to perform the second action. Reporting the second action may be performed in the same or similar manner as discussed above with reference to Step 205.

Returning to Step 209, if the presence of the input object does not indicate a second action, then a determination is made whether a second gesture is performed in Step 211. In one or more embodiments of the invention, the determination is made whether the second gesture is performed on the surface sensing region. Determining whether a second gesture is performed may include obtaining positional information about the input object subsequent to the performance of the first gesture and the presence of the input object in the above surface sensing region. The positional information is compared against stored gestures to determine whether a matching gesture exists.

If a second gesture is performed, then a second action is determined based on the performance of the second gesture, the presence of the input object in the above surface sensing region, and the first action in Step 217. Determining the second action may be performed in the same or similar manner described above with respect to Step 203.

In one or more embodiments of the invention, the second gesture is related to at least two candidate actions to perform in storage. At least one of the candidate actions related to the second gesture is independent of other gestures of the input object. Another of the candidate actions related to the second gesture is also related to the first action and the input object being in the above surface sensing region and not leaving the sensing region for more than the predefined length of time. Thus, for example, if the input object leaves the sensing region for more than the predefined length of time, then the input device determines that the user intends for the first action to be performed. However, if the input object remains in the sensing region and does not leave the sensing region for more than the predefined length of time, then the input device determines that the user intends a second action which is in some manner related to the first action.

In Step 219, a report of the second action and the second gesture is issued in accordance with one or more embodiments of the invention. Reporting the second action and the second gesture may be performed as described above with respect to Step 205.

Figure 3:
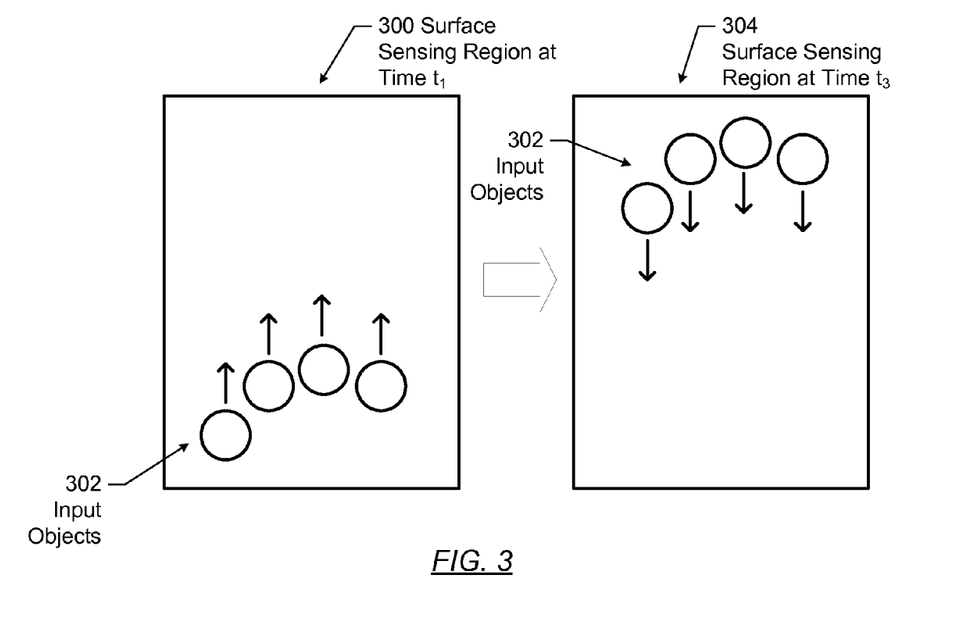
FIGS. 3-5 show examples in accordance with one or more embodiments of the invention.
Figure 4:
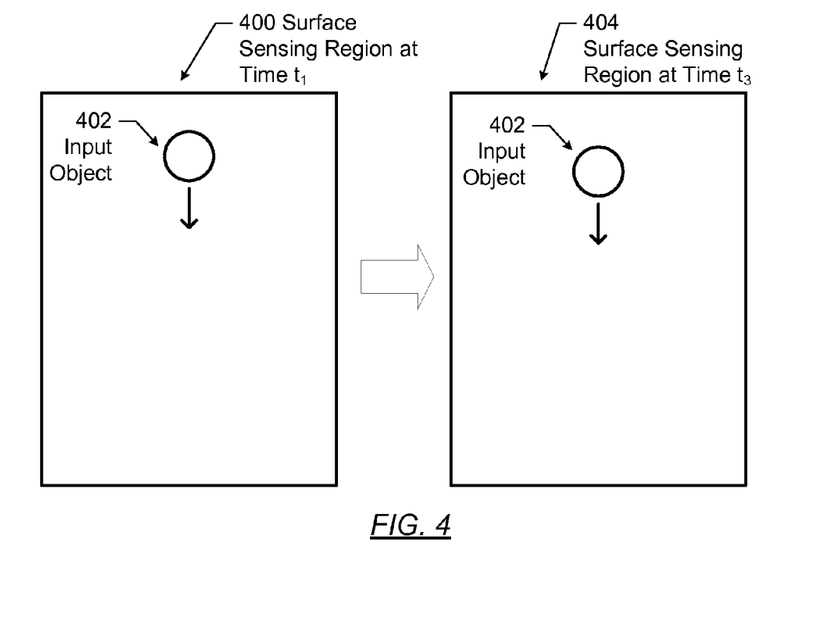
Figure 5:
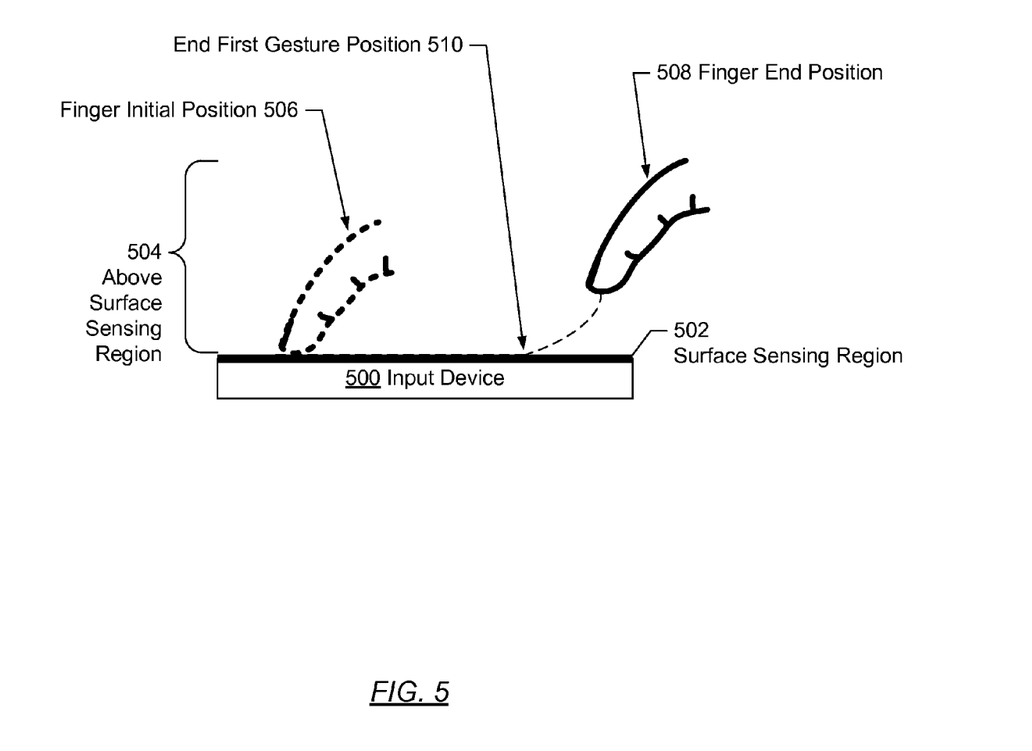

FIGS. 3-5 show examples in accordance with one or more embodiments of the invention. The following examples are for explanatory purposes only and not intended to limit the scope of the invention. FIGS. 3 and 4 show an example of gestures on the surface sensing region at time t1 and time t3. The input objects in FIGS. 3 and 4 are represented a circles. As will be discussed below, the action to perform in response to the input objects performing the gesture at time t3 is dependent on whether the input objects are detected in the above surface sensing region at time t2 which is in between time t1 and time t3.

Turning to FIG. 3, FIG. 3 shows an example of a four finger swipe in accordance with one or more embodiments of the invention. As shown on the surface sensing region at time t1 (300), the input objects (302) perform a four finger swipe upward starting at the bottom of the sensing region and ending at the top of the sensing region at time t1 (300). In response to the first gesture of the four finger swipe upward, the first action is to determine that all applications that are opened should be displayed on the display of the electronic system (e.g., in a restore down or maximize state whereby the content of opened documents are displayed). In response to the report of the first action, the electronic system displays all opened applications.

Turning to the surface sensing region at time t3 (304), the input objects (302) perform a four finger swipe starting at the top of the sensing region and ending at the bottom of the sensing region at time t3 (304). The second action to perform in response to the four finger swipe is dependent on whether at least one of the input objects was detected in the above surface sensing region and did not leave the above surface sensing region for more than the predefined length of time between time t1 and time t3. Specifically, if all of the input objects left the sensing region at time t2 between time t1 and time t3, then the determination is made that the user intended to show the desktop, as is standard for the four finger swipe downward. In other words, the action to show the desktop is independent of the first gesture with the four finger swipe. In contrast, if at least one input object is continually detected in the above surface sensing region after the performance of the first action at time t2 and remains until the start of the second gesture, the determination is made to effectively undo the first action. In other words, undoing the first action is to minimize all applications that were displayed in response to the first action and to display only any application that was displayed immediately prior to the first action.

By way of a more concrete example, consider the scenario in which the user has a word processing application, an internet browser, and a spreadsheet application opened. In the example, only the word processing application having a document is displayed. The internet browser and the spreadsheet application are opened, but appear minimized. When the user performs the four finger swipe upward, the user is able to view the document in the word processing application, the spreadsheet in the spreadsheet application, and a web page in the internet browser application. If the user's fingers leave the sensing region prior to performing the four finger swipe downward, then the desktop is displayed. However, if at least one of the user's fingers remain in the sensing region and then the user performs the four finger swipe downward, then the spreadsheet application and the internet browser are minimized and only the word processing application is displayed. In other words, the existence of the at least one finger remaining in the sensing region is indicative of the user wanting to undo the first action of displaying all opened applications.

FIG. 4 shows another example in accordance with one or more embodiments of the invention. Specifically, FIG. 4 shows an example of a drag and drop gesture. As shown in the surface sensing region at time t1 (400), the user selects a GUI component (e.g., icon, text box, window, etc.) on the display (e.g., by pressing a button (not shown)) and moves the input object (402) downward from the top of the surface sensing region to the bottom of the surface sensing region at time t1 (400). In response, the GUI component on the display is moved in the display in accordance with the drag.

As shown in the surface sensing region at time t2 (404), the user repeats the action of moving the input object (402) downward from the top of the surface sensing region to the bottom of the surface sensing region at time t1 (400). If at an intermediate time t2 between time t1 and t3, the input object (402) leaves the above surface sensing region, then the GUI component selected at time t1 is dropped in place. Specifically, the determination is made that the subsequent movement of the input object is independent of the drag and drop of the GUI component. For example, a cursor on the display may be moved without moving the GUI component. However, if the input object (402) remains in the above surface sensing region at time t2 and does not leave the above surface sensing region between time t1 and t3, then the determination is made that the user intended to continue the drag and drop of the GUI component. Thus, the second action is to move the GUI component in accordance with the second gesture performed at time t3.

As shown in the examples of FIGS. 3 and 4, each gesture is independently performed. Specifically, the first gesture has a defined action corresponding to the gesture. The second gesture in the example has at least two possible interpretations. The first interpretation is that the second gesture is completely independent of the first gesture. However, the second interpretation is that the user wants to continue or undo the first gesture. Namely, the hovering in the above surface sensing region by the user after completing the first gesture indicates that the second gesture is related to the first gesture and the first action.

FIG. 5 shows an example of interpreting input objects hovering in the above surface sensing region to imply that the user would like to perform a second action. Specifically, FIG. 5 shows an example flick gesture on an input device (500) having the surface sensing region (502) and the above surface sensing region (504) in accordance with one or more embodiments of the invention. For the purposes of the example, the input object is a finger. For the flick gesture, the finger initial position (506) is where the user places the finger at one side or edge of the surface sensing region (502). As shown by the dotted line, the finger moves along the surface sensing region (502) to the opposite side or edge and then moves upward into the above surface sensing region (504) until finishing at the finger end position (508). The movement upward may be a fast movement (e.g., a flick) that indicates the user would like to continue the scroll being performed while the user is moving across the surface sensing region.

From the input device perspective, while the finger is on the surface sensing region from the finger initial position (506) to the end first gesture position (510) (i.e., last position on the surface sensing region); a first gesture is detected and corresponds to the action of a scroll. At the end of the first gesture, the finger may leave the surface sensing region. When the finger leaves the surface sensing region, the user may intend either to end the scrolling or to quickly scroll several more lines.

To identify the intent of the user, the slope is used. The slope referred to in this application may be a mathematical slope (i.e., vertical distance divided by the horizontal distance), the angle of incidence with respect to the surface sensing region, or another such measure. Specifically, if the slope indicates a mostly vertical departure of the finger from the surface sensing region, then the determination may be made that the user intended to stop the scroll and no subsequent action is performed. However, if the slope indicates a mostly horizontal departure, then a flick is determined. Thus, the second action is performed to scroll several more lines, entries, pages, or other GUI component.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A method for gesture identification comprising:
   determining a first gesture is performed on a surface sensing region, wherein the first gesture comprises at least one input object;
   determining a first action corresponding to the first gesture, the first action being a scroll of at least a portion of the sensing region;
   issuing, based on performing the first gesture, a first report reporting the first gesture and the first action;
   determining, within a first predefined length of time subsequent to performing the first gesture, a presence of the at least one input object in an above surface sensing region;
   determining a second action corresponding to the first gesture and the at least one input object being in the above surface sensing region within the predefined length of time,
      wherein determining the second action comprises:
         determining an ending position of the at least one input object on the surface sensing region at the end of the performance of the first gesture;
         determining an above surface position of the at least one input object during the performance of the second gesture; and
         determining a slope between the ending position and the above surface position with respect to the surface sensing region, the slope corresponding to a vertical distance divided by a horizontal distance between the ending position and the above surface position, the horizontal distance being with respect to the surface sensing region,
      wherein the second action is determined, based on the slope, to be a continuance of the scroll in the first action; and
   issuing a second report reporting the second action.

2. A method for gesture identification comprising:
   determining a first gesture is performed on a surface sensing region, wherein the first gesture comprises at least one input object;
   determining a first action corresponding to the first gesture;
   issuing, based on the performance of the first gesture, a first report reporting the first gesture and the first action;
   determining, within a first predefined length of time subsequent to performing the first gesture, a presence of the at least one input object in an above surface sensing region;
   determining, within a second predefined length of time subsequent to determining the presence of the at least one input object being in the above surface sensing region, a second gesture is performed on the surface sensing region, where the second gesture comprises the at least one input object;
   determining a second action corresponding to the second gesture based on the first gesture, the presence of the at least one input object in the above surface sensing region, and the second gesture; and
   issuing, based on the performance of the second gesture, a second report reporting the second gesture and the second action,
   wherein the at least one input object comprises a first input object and a second input object,
   wherein determining the performance of the first gesture comprises detecting the first input object on the surface sensing region without detecting the second input object on the surface sensing region, and
   wherein determining the performance of the second gesture comprises detecting the second input object on the surface sensing region without detecting the first input object on the surface sensing region.

3. The method of claim 2, wherein the first predefined length of time is measured according to a number of frames.

4. The method of claim 3, wherein the first predefined length of time is a single frame.

5. The method of claim 2, wherein the second gesture corresponds to a request to perform the second action when the at least one input object remains in the sensing region after performing the first gesture, and wherein the second gesture corresponds to a request to perform a third action when the at least one input object leaves the surface sensing region and the above surface sensing region after performing the first gesture.

6. The method of claim 2, wherein the second action is an undo action of the first action.

7. The method of claim 2, wherein the second action is a continuation of the first action.

8. The method of claim 7, wherein the second action is a continued dragging of a displayed object dragged by the first action.

9. A processing system for a capacitive input device, the capacitive input device comprising an array of sensor electrodes configured to sense input objects in a sensing region of the input device, the processing system comprising functionality to:
- determine a first gesture is performed on a surface sensing region, wherein the first gesture comprises at least one input object;
- determine a first action corresponding to the first gesture;
- issue, based on performing the first gesture, a first report reporting the first gesture and the first action;
- determine, within a first predefined length of time subsequent to performing the first gesture, a presence of the at least one input object in an above surface sensing region;
- determine a second action corresponding to the first gesture and the at least one input object being in the above surface sensing region within the predefined length of time,
  - wherein the at least one input object comprises a first input object and a second input object,
  - wherein determining the performance of the first gesture comprises detecting the first input object on the surface sensing region without detecting the second input object on the surface sensing region, and
  - wherein determining the presence of the at least one input object in the above surface sensing region comprises detecting the second input object in the above surface sensing region without detecting the first input object in the above surface sensing region; and
- issue a second report reporting the second action.

10. The processing system of claim 9, wherein determining the second action comprises:
- determining an ending position of the at least one input object on the surface sensing region at the end of the performance of the first gesture;
- determining an above surface position of the at least one input object during the performance of the second gesture; and
- determining a slope between the ending position and the above surface position with respect to the surface sensing region,
- wherein the second action is determined to be a continuance of the first action based on the slope.

11. The processing system of claim 10, wherein the first action and the second is a scroll of at least a portion of the sensing region.

12. A processing system for a capacitive input device, the capacitive input device comprising an array of sensor electrodes configured to sense input objects in a sensing region of the input device, the processing system comprising functionality to:
- determine a first gesture is performed on a surface sensing region, wherein the first gesture comprises at least one input object;
- determine a first action corresponding to the first gesture;
- issue, based on performing the first gesture, a first report reporting the first gesture and the first action;
- determine, within a first predefined length of time subsequent to performing the first gesture, a presence of the at least one input object in an above surface sensing region;
- determine a second action corresponding to the first gesture and the at least one input object being in the above surface sensing region within the predefined length of time; and
- issue a second report reporting the second action,
- wherein the first gesture comprises a back and forth movement of the at least one input object on the surface sensing region,
- wherein the first action is to move a cursor on a display,
- wherein determining the presence of the at least one input object in the above surface sensing region comprises detecting a hovering of the at least one input object in the above surface sensing region, and
- wherein the second action is to emphasize the cursor on the display.

13. The processing system of claim 12, wherein emphasizing the cursor comprises at least one selected from a group consisting of moving the cursor to a central position on the display, highlighting the cursor, surrounding the cursor with a halo image, enlarging the cursor, animating the cursor, and moving the cursor.

* * * * *